United States Patent
Cuypers

(10) Patent No.: US 12,152,837 B2
(45) Date of Patent: Nov. 26, 2024

(54) SWITCHABLE SORPTION MATERIALS

(71) Applicant: Nederlandse Organisatie voor toegepast-natuurwetenschappelijk onderzoek TNO, The Hague (NL)

(72) Inventor: Ruud Cuypers, Rijswijk (NL)

(73) Assignee: Nederlandse Organisatie voor toegepast-natuurwetenschappelijk onderzoek TNO, 's-Gravenhage (NL)

( * ) Notice: Subject to any disclaimer, the term of this patent is extended or adjusted under 35 U.S.C. 154(b) by 954 days.

(21) Appl. No.: 17/269,373

(22) PCT Filed: Sep. 3, 2019

(86) PCT No.: PCT/NL2019/050569
§ 371 (c)(1),
(2) Date: Feb. 18, 2021

(87) PCT Pub. No.: WO2020/050717
PCT Pub. Date: Mar. 12, 2020

(65) Prior Publication Data
US 2021/0190437 A1 Jun. 24, 2021

(30) Foreign Application Priority Data
Sep. 3, 2018 (EP) ..................................... 18192269

(51) Int. Cl.
*F28D 20/00* (2006.01)
*C09K 5/16* (2006.01)

(52) U.S. Cl.
CPC .............. *F28D 20/003* (2013.01); *C09K 5/16* (2013.01); *F28D 2020/0078* (2013.01); *Y02E 60/14* (2013.01)

(58) Field of Classification Search
CPC . C09K 5/16; F28D 20/003; F28D 2020/0078; Y02E 60/14
See application file for complete search history.

(56) References Cited

U.S. PATENT DOCUMENTS

| 2010/0218491 | A1  | 9/2010  | Weimer et al. |
| 2010/0263832 | A1  | 10/2010 | Dalla Betta |
| 2014/0125288 | A1* | 5/2014  | Hanebuth ............. H01M 8/186 320/128 |
| 2016/0351938 | A1  | 12/2016 | Bentien et al. |

FOREIGN PATENT DOCUMENTS

EP 3293243 A1 3/2018

* cited by examiner

*Primary Examiner* — Lingwen R Zeng
(74) *Attorney, Agent, or Firm* — Verrill Dana, LLP

(57) ABSTRACT

The invention is directed to a method for decreasing the desorption enthalpy of a discharged high enthalpy sorption material that comprises a sorbed sorbate and that is at least partially discharged, wherein said method comprises a step 1) of reacting said discharged high enthalpy sorption material in a redox reaction to provide a discharged low enthalpy sorption material. In another aspect, the invention is directed to using this principle in methods for generating electrical energy from heat and vise versa. In addition, the invention is directed to a thermochemical energy storage device comprising a sorption material having at least two desorption enthalpy states, which preferably correlate to at least two oxidation states of which one oxidation state correlates to a higher desorption enthalpy than one or more of the other oxidation states.

20 Claims, 1 Drawing Sheet

SWITCHABLE SORPTION MATERIALS

Figure 1:
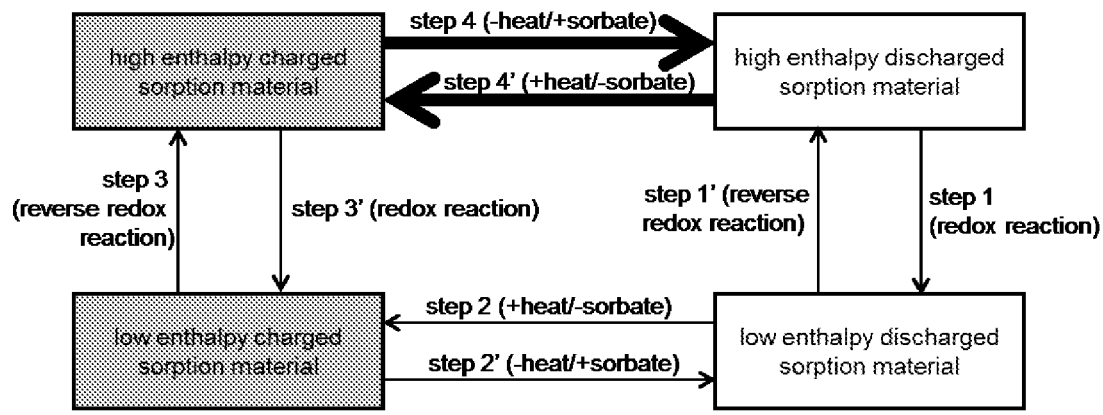

The invention relates to an energy device such as an energy storage device and/or an energy conversion device. The invention relates in particular to a thermochemical energy storage and/or a thermochemical conversion device. More in particular, it relates to e.g a specific kind of generator of heat from electrical energy, or a specific kind of generator of electrical energy from heat, and the methods for operation thereof.

Energy devices such as heat conversion and heat storage devices enable the storage and later on delivery of energy in the form of heat. For instance, heat storage devices can store excess of heat during the summer period and release the stored heat during the winter period. Alternatively, for cooling purposes, the heat stored in the charging process can be immediately released after the charging is finished in order to create a cooling effect in another part of the system. This is typically the method used in cooling or chiller devices or heat pumps.

Examples of known energy devices include hot water tanks (boiler technology), lithium-ion batteries and thermochemical energy storage devices, chillers and heat pumps. Thermochemical energy storage is particularly advantageous due to its relatively high energy storage density, its relatively low cost price per stored energy quantity and wide range of working temperatures with respect to other energy storage and conversion devices. In addition, the loss of energy during prolonged storage is minimal for thermochemical energy storage devices.

Thermochemical energy devices are typically based on reversible chemical reaction and/or sorption processes. During the charging of the device (i.e. the storing of heat) an endothermic reaction or desorption occurs by consuming heat. During the discharging of the device (i.e. release of heat), the reverse process, an exothermic reaction or sorption occurs and heat is released. Examples of typical chemical reaction and/or sorption processes for thermochemical heat storage are i.a. described in Cot-Gores et al., Renewable and Sustainable Energy Reviews 16 (2012) 5207-5224, which is incorporated herein in its entirety.

A drawback of the conventional thermochemical energy storage device systems is the poor flexibility in terms of heat storage and provision, both with respect to heat amount and heat quality. For instance, theoretically, the same heat that is obtained from discharging the system is required to charge the system: the same amount of heat (measured in joules) is necessary for loading as is obtained by unloading. However, due to ever occurring losses, in an actual system the amount needed is always higher than obtained. The same holds for the heat quality (measured in Kelvin): always some degradation is present during unloading with respect to loading. This effect occurs due to the driving force needed for loading (heat flow needed, no equilibrium situation), and obtained in unloading.

Typically due to efficiency limitations, the same quality of heat or heat value is required to charge the system as was obtained from discharging the system. This means that a low value heat, for instance water of a relatively low temperature such as 50° C., can not be used to efficiently charge the system. As a result, heat that may theoretically be stored, may actually not be stored due to practical limitations such as unavailability of a storage medium at the right temperature. Flexibility in this might drastically improve the amount of thermal energy stored.

Also, the reverse can be the situation for conventional thermochemical energy storage device systems: the same heat that is used to charge the system is typically obtained from discharging it. This can be a drawback in cases where low value heat is required. Although, low value heat can be obtained by dilution of high value heat, concomitant loss in efficiency is generally observed.

It is desired to provide a thermochemical energy storage device system that does not suffer from the above drawbacks and provides an improved flexibility in terms of heat storage and provision.

The present inventor surprisingly found that this can be achieved by providing a sorption material for use in for instance a thermochemical energy storage device that has at least two desorption enthalpy states, of which one state correlates to a higher desorption enthalpy than one or more of the other states. In particular, the inventor found that the different desorption enthalpy states of the sorption material correlate to different oxidation states of the material.

As such, the present invention is in particularly directed to a thermochemical energy storage device comprising a sorption material having at least two oxidation states, of which one oxidation state correlates to a higher desorption enthalpy than one or more of the other oxidation states.

In another related aspect, the invention is directed to a method for decreasing the desorption enthalpy of a discharged high enthalpy sorption material that comprises a sorbed sorbate and is at least partially discharged, wherein said method comprises a step 1) of reacting said discharged high enthalpy sorption material in a redox reaction to provide a discharged low enthalpy sorption material.

In the context of the present invention, the terms "high enthalpy" and "low enthalpy" are used to define the relative desorption enthalpies of the sorption material in the different states, i.e. before and after the redox reaction. Accordingly, the high enthalpy sorption material has a higher desorption enthalpy than the low enthalpy sorption material.

Without wishing to be bound by theory, the present inventor believe that by changing the oxidation state of the sorption material, the affinity of the sorbate and the sorption material can be changed. This may for instance be due to a structural change, e.g. a change of the crystal structure of the sorption material (if applicable) and concomitant larger optional vacancy in the crystal structure.

Typically depending on the specific sorption material that is used, either an oxidation or a reduction of the high enthalpy sorption material will lead to the low enthalpy sorption material. The redox reaction of the sorption material is preferably carried out by providing electrical energy and providing or removing electrons from the sorption material. As such, said redox reaction may in fact be a half reaction.

The invention is typically not limited to any type of sorption material, as long as the material can usably be reacted in a redox reaction, i.e. has at least two different oxidations states, and can be exothermally sorbed by a sorbate in at least the oxidation state corresponding to the high enthalpy charged state to release the stored heat energy.

As used herein, a sorbate refers to a substance that can be sorbed, i.e. adsorbed or absorbed, by the sorption material. Sorption material is in the art also referred to as sorbent. Thus, the sorbate may be adhered to or absorbed by the sorption material. In general, the sorbate is retained by the sorption material by forces (e.g. physical forces) such that it can be released (desorbed) without being chemically altered. Exothermal sorption means that upon sorption of the sorbate to the sorption material, heat is generated. Vise versa, upon desorption, heat is consumed. The amount of heat that is generated or consumed i.a. depends on the sorption enthalpy, which is a parameter that can i.a. be influenced by the oxidation state of the sorption material.

The sorbate can be selected based its property to exothermically sorb to the sorption material. Typical sorbates comprise one or more compounds selected from the group consisting of water, methanol, ethanol, ammonia, CO, $CO_2$ and/or other small molecules (organic and inorganic) that can sorb to the sorption material, or a combination thereof. Preferably, the sorbate is water.

In general, in particular when the redox reaction is carried out by applying an electrical potential, the appropriate combination of sorption material and sorbate can be i.a. made by comparing the oxidation/reduction potentials of the sorbate and sorption material. As such, undesirable redox reaction of the sorbate can be prevented or at least limited.

Generally suitable sorption materials are based on one or more polycyclic aromatic hydrocarbons such as perylene and/or salts comprising $Fe(CN)_6)^{3-}$ as anion, $H_2PtCl_6$, $H_3Fe(CN)_6$, ferrocene, $Pt(NH_3)_2Cl_4$, $Co(NH_3)_6$, or variations thereof with other metal ions such as Pt, Fe, Pd, Co. Alternatively or in addition to the polycyclic aromatic hydrocarbons and/or salts, preferably in addition to, the sorption material comprises a carrier material. Suitable carriers in this respect include carbon-based frameworks, such a fullerenes (e.g. carbon nanotubes), silica, zeolite and molecular frameworks such as a metal organic framework (MOF), covalent organic framework (COF), polymer-organic framework (POF), or combinations thereof. In a particular embodiment, the salt is positioned (e.g. impregnated) within the carrier material. In this particular embodiment, the salt and the carrier material may both sorb the sorbate, or only the salt may sorb the sorbate. This typically depends on the particular materials used in combination with the sorbate. In embodiments wherein the carrier material may itself at least partially be capable of sorbing the sorbate, it is preferred that the sorption material comprises the molecular framework such as the metal organic framework (MOF), covalent organic framework (COF), polymer-organic framework (POF), or combinations thereof. The advantage of molecular frameworks is that they can both sorb the sorbate and be redox active, meaning that the are susceptible to the redox reaction to change the sorption enthalpy. The molecular framework can for instance be based on polycyclic aromatic hydrocarbons such as perylene di-imide, melamine, terephthaldehyde and the like. Examples of suitable molecular frameworks may be those disclosed in Coa et al. *Nanoscale* 10 (2018) 6884-6891 and Schwab et al. *Journal of the American Chemical Society* 131 (2009) 7216-7217. The molecular framework can advantageously be electron conductive and facilitate the oxidation of the optional salt therein.

The present method for decreasing the desorption enthalpy of a discharged high enthalpy sorption material can particularly advantageously be used in a thermochemical energy storage device. Accordingly, in a further aspect the present invention is directed to a method for operating a thermochemical energy storage device, wherein said method comprises decreasing the desorption enthalpy of a discharged high enthalpy sorption material by step 1).

As illustrated in FIG. 1, in a preferred embodiment, step 1) is followed by a step 2) of at least partially charging the discharged low enthalpy sorption material to provide an at least partially charged low enthalpy sorption material and a desorbed sorbate, wherein said charging comprises heating the discharged low enthalpy sorption material. In FIG. 1, heating of the sorption material is indicated by "+heat", while release of heat is indicated by "−heat". Analogously, addition (i.e. sorption) of the sorbate to the sorption material is indicated by "+sorbate", while removal (i.e. desorption) of the sorbate from the sorption material is indicated by "−sorbate". In the present invention, due to the difference in enthalpies, discharging of the charged high enthalpy sorption material (i.e. step 4 in FIG. 1) provides more heat than is required to charge the discharged low enthalpy sorption material in step 2. The energy difference is provided by the redox reaction in step 1.

As also illustrated in FIG. 1, step 2) may be followed by a step 3) of reacting said charged low enthalpy sorption material in a further redox reaction to provide an at least partially charged high enthalpy sorption material, preferably wherein the redox reaction in step 3) is the reverse reaction of the redox reaction of step 1). Thus, in the embodiments wherein the redox reaction of step 1 is an oxidation reaction, the redox reaction of step 3 is a reduction reaction.

The steps of the present invention may be carried out to full conversion (i.e. to full charge, discharge, oxidation or reduction-depending on what is applicable) or may be carried out only partially. As such, the charged and discharged states of the material are to be considered at least partially charged and at least partially discharged. In addition, the steps may be carried out simultaneously. For instance, the redox reaction (step 1) and charging of the discharged low enthalpy sorption material (step 2) can be carried out simultaneously by providing both electrical energy and heat.

Advantageously, the method of the present invention for operating the thermochemical energy storage device, provides the possibility that at least two different qualities of heat can be provided by the device. As explained hereinabove, discharging of the charged high enthalpy sorption material (i.e. step 4 in FIG. 1) provides more heat than is required to charge the discharged low enthalpy sorption material in step 2. Since the same amount of heat is associated with discharging of the charged low enthalpy sorption material (i.e. step 2' in FIG. 1) as with the charging of that material in step 2, discharging in step 2' provides less heat than is provided by discharging of the charged high enthalpy sorption material (i.e. step 4) such that indeed at least two different qualities of heat can be provided by the device.

In both step 2' and 4, discharging of the charged sorption material can comprise full discharging to discharge essentially all heat from the sorption material, or the discharge may be carried out only partially. This may depend on the demand of heat quantity and can be controlled by providing a controlled amount of sorbate. Analogously, in both step 2 and 4', charging of the discharged sorption material can comprise full charging of the sorption material, or the charge may be carried out only partially. This may depend on the quality and availability of heat and can be controlled by allowing a controlled release of sorbate.

The principle of decreasing the desorption enthalpy in accordance with the present invention, may in reverse advantageously be used for generating electrical energy from heat. As described, discharging of the charged high enthalpy sorption material (i.e. step 4 in FIG. 1) provides more heat than is required to charge the discharged low enthalpy sorption material in step 2. The energy difference is provided by the redox reaction in step 1. Thus, following the method of steps 1), 2), 3), and 4), electrical energy required for the redox reaction in step 1) is converted onto stored heat. Analogously, the reverse method steps (i.e. steps 1'), 2'), 3') and 4') in FIG. 1), can result in conversion of heat into electrical energy. Accordingly, another aspect of the present invention is directed to a method for generating electrical energy from heat, wherein said method comprises:

a step 4') of at least partially charging the discharged high enthalpy sorption material to provide an at least partially charged high enthalpy sorption material and a desorbed sorbate, wherein said charging comprises heating the discharged high enthalpy sorption material;

a step 3') of reacting the provided charged high enthalpy sorption material in a redox reaction to provide a charged low enthalpy sorption material;

a step 2') of at least partially discharging the provided charged low enthalpy sorption material by supplying the sorbate in order to give a discharged low enthalpy sorption material and heat; followed by a step 1') of reacting the provided discharged low enthalpy sorption material in a redox reaction to provide a discharged high enthalpy sorption material and electrical energy.

A further aspect of the present invention relates to a thermochemical energy device, in particular an energy storage device, comprising the sorption material having at least two desorption enthalpy states as described herein. The desorption enthalpy states correlate to oxidation states of which one oxidation state correlates to a higher desorption enthalpy than one or more of the other oxidation states.

Figure 2:
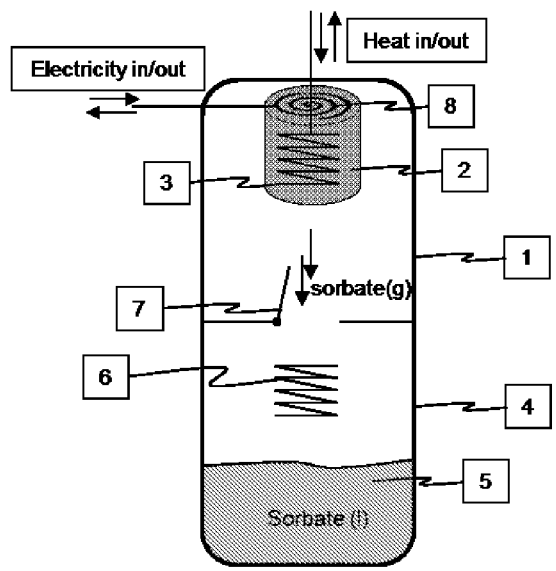

FIG. 2 schematically illustrates a particular embodiment of the thermochemical energy storage device in accordance with the present invention. The thermochemical energy storage device comprises the sorption material (2) that is typically located in an energy storage compartment (1). The energy storage compartment generally further comprises a heat exchanger (3) that is thermally connected to the sorption material such that the sorption material can receive from and/or release heat to the exterior of the energy storage compartment.

The thermochemical energy device typically further comprises a sorbate (e.g. water) storage compartment (4) comprising a condenser (6) such that sorbate vapor (e.g. water vapor) that is released from the sorption material can be condensed and collected (5). When the device is discharged, the condenser (6) may function as an evaporator unit to evaporate the condensed sorbate. The sorbate storage compartment may also comprise an evaporator unit separate from the condenser. Preferably the evaporator unit (whether it is the condenser (6) acting as such or a separate unit) is preferably at least partly submerged in the condensed sorbate vapor (5) to efficiently heat the condensed sorbate.

During operation, the thermochemical energy device typically operates under reduced pressure, preferably vacuum (except from the partial water vapor pressure). For discharging the device, the sorbate (e.g. water) may flow from the sorbate storage compartment (4) towards the sorption material such that heat can be generated. The flow rate can be controlled by a restricted gas flow passage which is preferably closable by a valve (7).

To induce the redox reaction of the sorption material, it can be placed in an electrochemical cell such as an electrolytic cell, and in electrical contact with an electrode such as an anode or cathode of said electrochemical cell. For practically suitable and efficient heat storage, it is generally preferred that the sorption material fills as much of the energy storage compartment as possible. As such, the effective energy storage capacity per device volume is as large as possible. On the other hand, electrochemically induced redox reactions (i.e. redox reactions carried out by applying an electrical potential) involves generally the transfer of electrons of an electrode surface to the sorption material, due to which the efficiency benefits from a higher surface area. For the present invention, as illustrated in FIG. 1, it is therefore particularly preferred that the electrochemical cell comprises a large-surface-area (e.g. as a Swiss-roll cell) (8), which comprises a flexible sandwich of electrodes and membranes rolled around an axis providing a three-dimensional (3D) electrical cell space for the sorbent material. In different contexts, Swiss-roll cells are described in i.a. Robertson, *Electrochimica Acta,* 22 (1977) 411-419 and A. Aziznia, C. W. Oloman, E. L. Gyenge, *Journal of Power Sources,* 212, (2012) 154-160.

Alternative, or in addition to the Swiss-roll cell, the electrochemical cell may comprise porous electrodes, composite electrodes and the like which may comprise sorption material at an efficient volume to area ratio. In yet another particular embodiment, the structural integrity of the electrode may be provided by the molecular framework such as the MOF, POF, COF or the like, in which the salt is positioned that undergoes sorption, desorption and the redox reaction.

The invention claimed is:

1. Method for decreasing the desorption enthalpy of a discharged high enthalpy sorption material that comprises a sorbed sorbate and that is at least partially discharged, wherein said method comprises a step 1) of reacting said discharged high enthalpy sorption material in a redox reaction to provide a discharged low enthalpy sorption material.

2. Method according to claim 1, wherein said redox reaction comprises oxidation or reduction of the discharged high enthalpy sorption material.

3. Method according to claim 1, wherein said redox reaction is carried out by providing electrical energy to the discharged high enthalpy sorption material.

4. Method for operating a thermochemical energy storage device, wherein said method comprises decreasing the desorption enthalpy of a discharged high enthalpy sorption material by step 1) in accordance with claim 1.

5. Method according to claim 4, wherein step 1) is followed by a step 2) of at least partially charging the discharged low enthalpy sorption material to provide an at least partially charged low enthalpy sorption material and a desorbed sorbate, wherein said charging comprises heating the discharged low enthalpy sorption material.

6. Method according to claim 5, wherein step 2) is followed by a step 3) of reacting said charged low enthalpy sorption material in a redox reaction to provide a charged high enthalpy sorption material.

7. Method according to claim 6, wherein step 3) is followed by a step 4) of at least partially discharging said charged high enthalpy sorption material by supplying a sorbate in order to provide said discharged high enthalpy sorption material and heat.

8. Method according to claim 5, wherein said method comprises a step 2') of at least partially discharging the charged low enthalpy sorption material by supplying the sorbate in order to give the discharged low enthalpy sorption material and heat.

9. Method for generating electrical energy from heat, the method comprising performing the method according to claim 7, wherein said method further comprises:

a step 4') of at least partially charging the discharged high enthalpy sorption material to provide an at least partially charged high enthalpy sorption material and a desorbed sorbate, wherein said charging comprises heating the discharged high enthalpy sorption material;

a step 3') of reacting the provided charged high enthalpy sorption material in a redox reaction to provide a charged low enthalpy sorption material;

a step 2') of at least partially discharging the provided charged low enthalpy sorption material by supplying the sorbate in order to give a discharged low enthalpy sorption material and heat; followed by a step 1') of reacting the provided discharged low enthalpy sorption material in a redox reaction to provide a discharged high enthalpy sorption material and electrical energy.

10. Method according to claim 1, wherein said sorption material comprises polycyclic aromatic hydrocarbon such as perylene and/or a salt comprising Fe(CN)6)3– as anion, H2PtCl6, H3Fe(CN)6, ferrocene, Pt(NH3)2Cl4, Co(NH3)6, or variations thereof with other metal ions.

11. Method according to claim 1, wherein the sorption material comprises a molecular framework such as a metal organic framework (MOF), covalent organic framework (COF), polymer-organic framework (POF), or a combination thereof.

12. Method according to claim 1, wherein the sorbate comprises a compound selected from the group consisting of water, methanol, ethanol, ammonia, CO, CO2 and/or other small molecules that can sorb to the sorption material, or a combination thereof.

13. Thermochemical energy storage device comprising a sorption material having at least two desorption enthalpy states, which correlate to at least two oxidation states of which one oxidation state correlates to a higher desorption enthalpy than one or more of the other oxidation states, more preferred which is adapted such that it can be operated in a method according to claim 1.

14. Thermochemical energy storage device according to claim 13, wherein said sorption material is placed in an electrochemical cell and is in electrical contact with an electrode such as an anode or cathode of said electrochemical cell, preferably wherein said electrochemical cell comprises a Swiss-roll cell.

15. Thermochemical energy storage device according to claim 13, further comprising a liquid storage compartment comprising a condenser and/or evaporator unit and an energy storage compartment comprising the sorption material, and a heat exchanger that is thermally connected to the sorption material.

16. Method according to claim 6, wherein the redox reaction in step 3) is the reverse reaction of the redox reaction of step 1).

17. Method according to claim 10, wherein the other metal ions are Pt, Fe, Pd, or Co.

18. Method according to claim 11, wherein said sorption material comprises a salt comprising $Fe(CN)_6)^{3-}$ as anion, $H_2PtCl_6$, $H_3Fe(CN)_6$, ferrocene, $Pt(NH_3)_2Cl_4$, $Co(NH_3)_6$, or a variation thereof with other metal ions, and wherein the salt is positioned within the molecular framework.

19. Method according to claim 18, wherein the other metal ions are Pt, Fe, Pd, or Co.

20. Method according to claim 12, wherein the sorbate is water.

* * * * *